US006778872B2

(12) United States Patent
Jorgenson et al.

(10) Patent No.: US 6,778,872 B2
(45) Date of Patent: Aug. 17, 2004

(54) TRANSACTIONAL SUPPLY CHAIN SYSTEM AND METHOD

(75) Inventors: William L. Jorgenson, Provincetown, MA (US); Mark Brogger, Boston, MA (US)

(73) Assignee: Deere & Company, Moline, IL (US)

( * ) Notice: Subject to any disclaimer, the term of this patent is extended or adjusted under 35 U.S.C. 154(b) by 201 days.

(21) Appl. No.: 09/872,846

(22) Filed: Jun. 1, 2001

(65) Prior Publication Data

US 2002/0032497 A1 Mar. 14, 2002

Related U.S. Application Data

(60) Provisional application No. 60/208,992, filed on Jun. 1, 2000, and provisional application No. 60/238,257, filed on Oct. 5, 2000.

(51) Int. Cl.[7] .......................... G06F 17/60; G06F 19/00
(52) U.S. Cl. .......................... 700/106; 700/214; 705/80
(58) Field of Search ................................. 700/106, 115, 700/214–216; 705/80

(56) References Cited

U.S. PATENT DOCUMENTS

| 5,478,990 | A | * | 12/1995 | Montanari et al. .......... 235/375 |
| 5,790,428 | A | | 8/1998 | Easton et al. ................ 364/561 |
| 5,913,619 | A | | 6/1999 | Lowe ........................... 40/665 |
| 5,946,662 | A | | 8/1999 | Ettl et al. |
| 5,953,707 | A | | 9/1999 | Huang et al. |
| 6,055,227 | A | | 4/2000 | Lennert et al. |
| 6,246,919 | B1 | * | 6/2001 | Hassel ......................... 700/116 |
| 6,249,714 | B1 | | 6/2001 | Hocaoglu et al. |
| 6,327,569 | B1 | * | 12/2001 | Reep ............................ 705/1 |
| 6,336,066 | B1 | | 1/2002 | Pellenc et al. ................ 701/50 |
| 6,366,829 | B1 | * | 4/2002 | Wallace ....................... 700/236 |
| 6,453,306 | B1 | * | 9/2002 | Quelene ...................... 705/80 |
| 6,496,806 | B1 | | 12/2002 | Horwitz et al. ............... 705/28 |
| 2001/0011437 | A1 | | 8/2001 | Shortridge et al. |
| 2002/0026403 | A1 | * | 2/2002 | Tambay et al. ............... 705/37 |
| 2002/0032626 | A1 | * | 3/2002 | DeWolf et al. ............... 705/35 |
| 2002/0069125 | A1 | * | 6/2002 | Bruck et al. .................. 705/26 |
| 2002/0120555 | A1 | * | 8/2002 | Lerner ......................... 705/37 |
| 2003/0061069 | A1 | * | 3/2003 | Silverman et al. ............ 705/1 |

FOREIGN PATENT DOCUMENTS

FR  2 776 790  10/1999

OTHER PUBLICATIONS

Hord, Bill. "Agriculture Meeting Puts Nebraska Producers On Notice: Make Food Traceable", Knight–Ridder Tribune, Mar. 7 2002, http:/131.104,232.9/fsnet/2002/3–2002/fsnet_march_9.htm.

* cited by examiner

Primary Examiner—Leo Picard
Assistant Examiner—Elliot Frank

(57) ABSTRACT

A supply chain system including a first interface operable to allow a first individual to input first information associated with an item and a second interface operable to allow a second individual to input second information associated with a first processing of the item, wherein the first interface and the second interface are coupled to each other via a network connection.

29 Claims, 11 Drawing Sheets

TRANSACTIONAL SUPPLY CHAIN SYSTEM AND METHOD

CROSS-REFERENCE TO RELATED APPLICATIONS

The present application claims benefit of provisional application Nos. 60/208,992 and 60/238,257 filed Jun. 1, 2000 and Oct. 5, 2000, respectively.

FIELD

The present application generally relates to a transactional supply chain system and method and, more particularly, to a system and method for allowing transactions to occur at and between one or more stages along a supply chain while communicating these transactions to one or more participants in a real-time manner and for enabling the participants to trace the history of a product along the supply chain.

BACKGROUND

Producers, such as farmers, can subscribe to a grower-based system. A grower-based system enables a farmer to input information relating to the farmer's fields and crops. Such information can include what varieties of a crop are being grown, the quantity of the crops being grown, the location of the crops, any inputs applied to the crop and any farm technique to encourage growth or control weeds and insects. The grower-based system allows the farmer to manage the farm better, for example, to enhance the farm's yield. However, a variety of difficulties still exist for the farmer to gain value for the crop or livestock. These difficulties lie in limited information flow and market signals limited mainly to price and yield, with multiple tiers used in moving a product to market, the farmer is removed from understanding and coordinating inputs with value traits wanted by end-users, coordinating livestock needs with markets, and environmental and food safety compliance/traceability. A farmer, unless contracted, relies primarily on price markets to sell a harvest.

Once a crop is grown and harvested, the crop is stored, then transported to a processor that processes the crop. The processor is also faced with difficulties, including few information links with raw material producers beyond buy and sell relationships, unwanted, undesired or unmet commodity quality traits, inefficiencies due to a multi-tiered structure and inconsistency of supply, lack of information on how desired crops are grown and how to efficiently source the crops, excess inventory caused by lack of real-time data, poor verification and safety traceability which can lead to serious safety issues as seen with Mad Cow Disease and Starlink issues, loss of product efficiencies due to lack of trait consistent traceable identification, environmental and food safety compliance, and, therefore, makes verifying brand claims difficult and creating new products from known ingredients harder.

Further, individuals or companies within a supply chain traditionally have been transacting business on a one-to-one basis, that is, communicating via telephone, fax, e-mail or in-person requirements, logistics, and terms for a purchase or sale to take place. For example, a producer wanting to do business with a first stage processor transacts business on a one-to-one basis with the first stage processor. In addition, the first stage processor transacts business with producers and manufacturers on a one-to-one basis or through some form of a buying group. The manufacturers then transact business with retailers, wholesalers, distributors, or other end-users who get products into the hands of consumers.

There is a need for a system and method that allows an individual or company within a supply chain to transact and manage business with one or more other individuals or companies within or outside the supply chain from a single web-based environment so that a collaborative supply chain can be created. Further, what is needed is a system and method for tracing ingredient history of products using the single web-based environment.

SUMMARY OF THE INVENTION

An aspect of the present application provides for a supply chain system, including a first interface operable to allow a first individual to input first information associated with an item, and a second interface operable to allow a second individual to input second information associated with a first processing of the item, wherein the first individual and the second individual can access the inputted first information and the inputted second information via a network connection. Another aspect of the present application provides for a supply chain system. The supply chain system includes at least one producer interface operable to allow at least one producer to input first information, a producer server coupled to the at least one producer interface for processing the first information associated with an item, a producer database coupled to the producer server for storing the first information, at least one processor interface operable to allow at least one processor to input second information, a processor server coupled to the at least one processor interface for processing the second information associated with the item, a processor database coupled to the processor server for storing the processed second information, at least one manufacturer interface operable to allow at least one manufacturer to input third information associated with the item, a manufacturer server coupled to the at least one manufacturer server for processing the third information, and a manufacturer database coupled to the manufacturer server for storing the processed third information, wherein the producer server, the processor server and the manufacturer server are coupled to each other via an Internet connection.

A further aspect of the present application provides for a method for facilitating at least one transaction between a first individual within a supply chain and a second individual within or outside the supply chain, including networking a plurality of individuals within or outside the supply chain together in a single web-enabled environment, the plurality of individuals including the first individual and the second individual, and routing transactional data between at least the first individual and the second individual.

A still further aspect of the present application provides for a method for tracing a first item and a second item including the first item as the first item and second item progress along a supply chain. The method includes associating first information with the first item at a stage of the supply chain, and associating second information and the first information with the second item including the first item at another stage of the supply chain.

DETAILED DESCRIPTION

Figure 1:
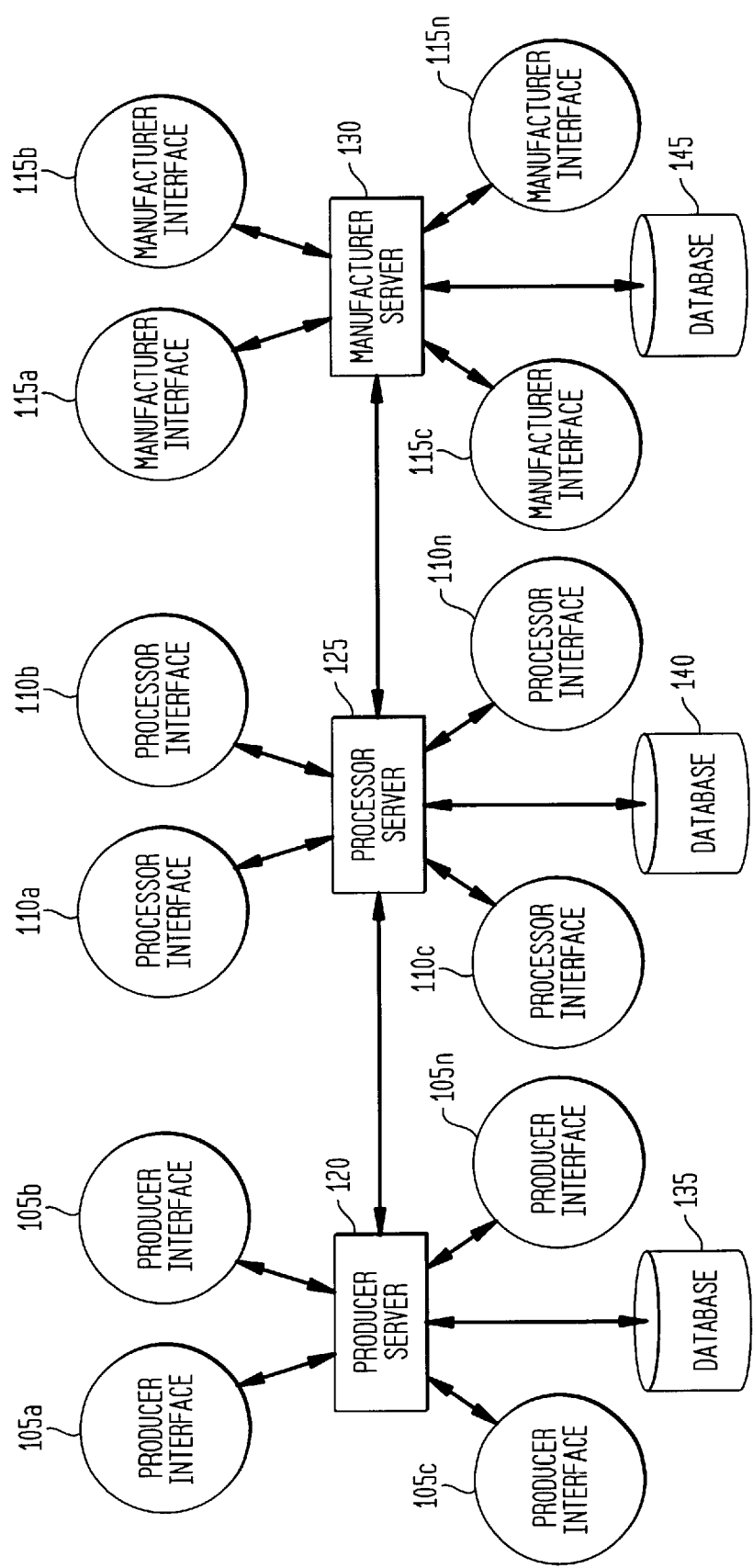
FIG. 1 shows an exemplary embodiment of a transactional supply chain system.

FIG. 1 illustrates an exemplary embodiment of transactional supply chain system 100. Even though the following exemplary embodiments are explained with reference to the crop wheat and to a supply chain including a producer, such as a farmer, a first stage processor, such as a mill, and a manufacturer, such as a bakery, the present application can be applied to other items, for example, other varieties of crops, livestock, farm inputs, machinery products, and a host of other products or services used in the business of farming, processing, or distributing of agricultural products and food. In alternative embodiments, additional processors and corresponding processing stages can be incorporated into transactional supply chain system 100. Moreover, the present application is not limited to producers, processors and manufacturers, rather other stages can be included in transactional supply chain system 100 having respective interfaces, such as one or more stages including seed companies, one or more stages providing storage and/or one or stages including companies providing inputs, for example, fertilizers.

Figure 2:
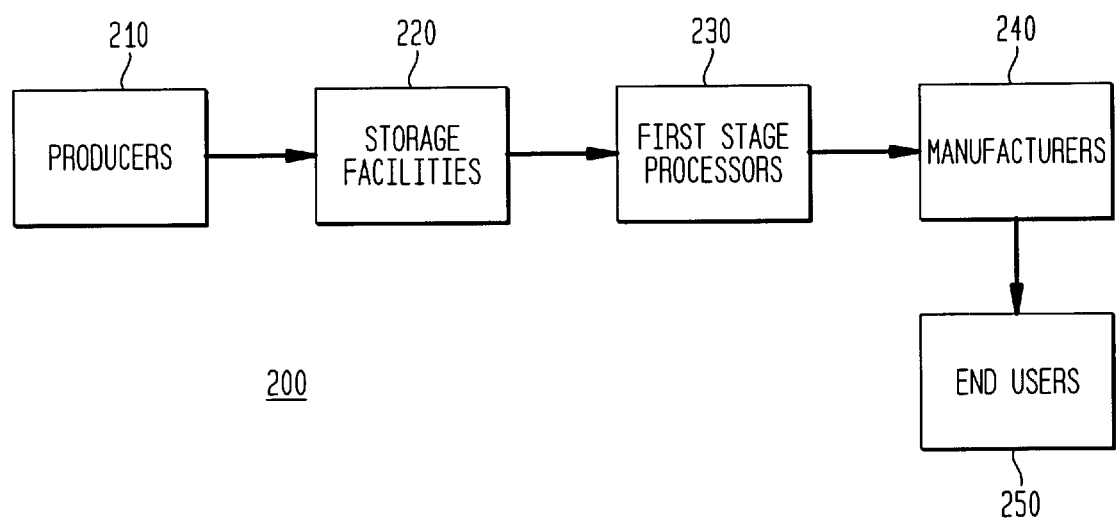
FIG. 2 shows an exemplary embodiment of a supply chain.

FIG. 2 illustrates an exemplary embodiment of a supply chain 200 including various participants, such as producers 210, storage or elevator facilities 220, first stage processors 230, manufacturers 240 and end-users 250. In the exemplary embodiments of the present application, participants can be either individuals or companies within or outside a supply chain. The participants of the supply chain 200 transact and manage business in a single web-based environment. As a result, in an exemplary embodiment, information can be shared up and down the supply chain 200 by all participants forming a collaborative supply chain and one or more participants can trace the history of one or more items or other items included therein.

Transactional supply chain system 100 shown in FIG. 1 includes one or more producer interfaces 105a . . . 105n, producer server 120, database 135, one or more processor interfaces 110a . . . 110n, processor server 125, database 140, one or more manufacturer interfaces 115a . . . 115n, manufacturer server 130 and database 145. In an exemplary embodiment, producer interfaces 105a . . . 105n, processor interfaces 110a . . . 110n and manufacturer interfaces 115a . . . 115n are one or more web pages and are coupled to their respective servers via a wireless or land-line Internet connection. Producer server 120, processor server 125 and manufacturer server 130 are coupled together such that an individual using any interface within transactional supply chain system 100 can gain access to any information stored on each database 135, 140, 145, creating a series of private networks based on the collaborative workings of all participants. In an alternative embodiment, individuals are restricted from gaining access to particular stored information. Transactional supply chain system 100 including three separate servers coupled to respective databases is merely illustrative. Accordingly, more or less servers and databases can be utilized and arranged in a variety of configurations, for example, a single central server coupled to one or more databases can be used in transactional supply chain system 100.

As shown in FIG. 1, producer interfaces 105a . . . 105n are coupled to database 135 via producer server 120. A producer, for example, a farmer, inputs crop information relating to one or more crops, such as wheat, into database 135 via the respective producer interface 105a . . . 105n. In an exemplary embodiment, crop information includes planning data, pre-planting soil preparation data, data indicative of the varieties of wheat being grown, data indicative of the quantity of wheat being grown, data indicative of the location of the wheat, inputs data such as crop chemicals or other treatments, planting data, crop growth and monitoring data, including but not limited to environmental monitoring data, harvesting data, transport data, financial data, and transfer and storage data. Other data can be inputted and stored as well. Further, each farmer can input information such as whether the wheat is genetically modified, organic and kosher and what pesticides have been used.

A first stage processor, for example, a mill, using one of processor interfaces 110a . . . 110n has access via the Internet to database 135 having stored therein data inputted by one or more farmers. In an alternative embodiment, a manufacturer, such as a bakery, and/or other participants within or outside the supply chain 200 can also access data stored in database 135. In an exemplary embodiment, each processor can only access data stored in database 135 associated with farmers that have granted the processor permission. In a further exemplary embodiment, a farmer can limit which data particular processors can access. For example, a farmer may grow and harvest multiple varieties of wheat and limit a particular processor to accessing information about only one of the varieties or about only some of the fields where crops are grown.

Once the wheat is grown and harvested, the wheat is thereafter transported first to storage, for example, an elevator, and then, upon being purchased, to a processing facility, such as a mill, for processing the wheat to flour. A processor using one of processor interfaces 110a . . . 110n inputs information into database 140 via processor server 125. In an exemplary embodiment, the information includes planning data, wheat storage data, milling data, such as moisture and protein level, kernel size, flour storing data, packaging data, data indicative of yields in production, finished product storage data and shipping data. Other data can be inputted and stored as well. A manufacturer, such as a bakery, using one of manufacturer interfaces 115a . . . 115n can then access the information about the flour stored in database 140 via the Internet. In an exemplary embodiment, the manufacturer can only access information stored in database 140 associated with processors that have granted the manufacturer permission. In a further exemplary embodiment, a processor can limit which information the manufacturer can access. For example, the processor may only allow a manufacturer to view moisture level data or lot specifications associated with the processing of a particular variety of wheat or wheat recipe from specific storage containers made for their exclusive use. In an alternative embodiment, a producer using one of producer interfaces 105a . . . 105n can also access information stored in database 140.

After the item is processed, for example, after the wheat is processed into flour, the wheat is purchased by a manufacturer, such as a bakery, via one of manufacturer interfaces 115a . . . 115n to convert the flour into dough and then into a finished product. A manufacturer using one of manufacturer interfaces 115a . . . 115n inputs information into database 145 via manufacturer server 130. In an exemplary embodiment, the information includes performance data, for example, data indicative of whether the finished product met specifications, quality data, for example, how a finished product scores, referred to as bake score data, and yield data. Other data can be inputted and stored as well. A producer and/or a processor using one of producer interfaces 105a . . . 105n and/or one of processor interfaces 110a . . . 110n, respectively, can then access the information about the flour, dough and/or finished product stored in database 145 via the Internet. In an exemplary embodiment, the producers and/or the processors can only access information stored in database 145 associated with manufacturers that have granted the producers and processors permission. In a further exemplary embodiment, a manufacturer can limit which information the producers and the processors can access. For example, the manufacturers may only allow one or more producers and/or one or more processors to view certain data associated with particular lots of finished products.

Transactional supply chain system 100 enables a processor and/or manufacturer to store less wheat and/or flour, respectively, due to the ability of looking down the supply chain to determine, for example, available inventory and types of inventory. Transactional supply chain system 100 also enables a processor and/or manufacturer to demand wheat and flour shortly before fulfilling pending orders.

In an exemplary embodiment, transactional supply chain system 100 also includes an inspection device, not shown in FIGS. 1 and 2. The inspection device can be one or more individuals, such as independent third parties, who manually or through lab analysis perform inspections. The inspection device inspects farmer fields, growing practices, processing and storage facilities and/or associated products. The inspection device can verify that information input into databases 135, 140, 145 is accurate. For example, an inspection will verify that "x wheat" is organic and does not use a particular pesticide. The inspection may be performed by an individual going to the farmer's facility to manually test the wheat, or it might be done from an analysis device at the point of inspection or in the lab. In an exemplary embodiment, the inspection information is stored in a database that can be accessed via producer interfaces 105a . . . 105n, processor interfaces 110a . . . 110n and/or manufacturer interfaces 115a . . . 115n.

In a further exemplary embodiment, a participant, which can be one or more individuals or companies, specifies points of entry along a supply chain where the participant wants feedback/verification information. For example, a participant, such as a bakery, can specify the desired feedback information such as inspection results at one or more producer fields, moisture and protein level of a certain variety of wheat or availability of key output traits tied to a specific product claim in a bakery's product, for example, having more bran than other varieties of wheat. Once the feedback information is determined, the bakery can access the information stored, for example, in a verification database. In addition, the participant can specify using, for example, a personalization engine, who in particular the participant wants to have access to specific information. For example, a farmer may only desire particular mills to be capable of viewing information about all or some of the farmer's crop. Each participant has control over who can view what information associated with the respective participant.

Figure 3:
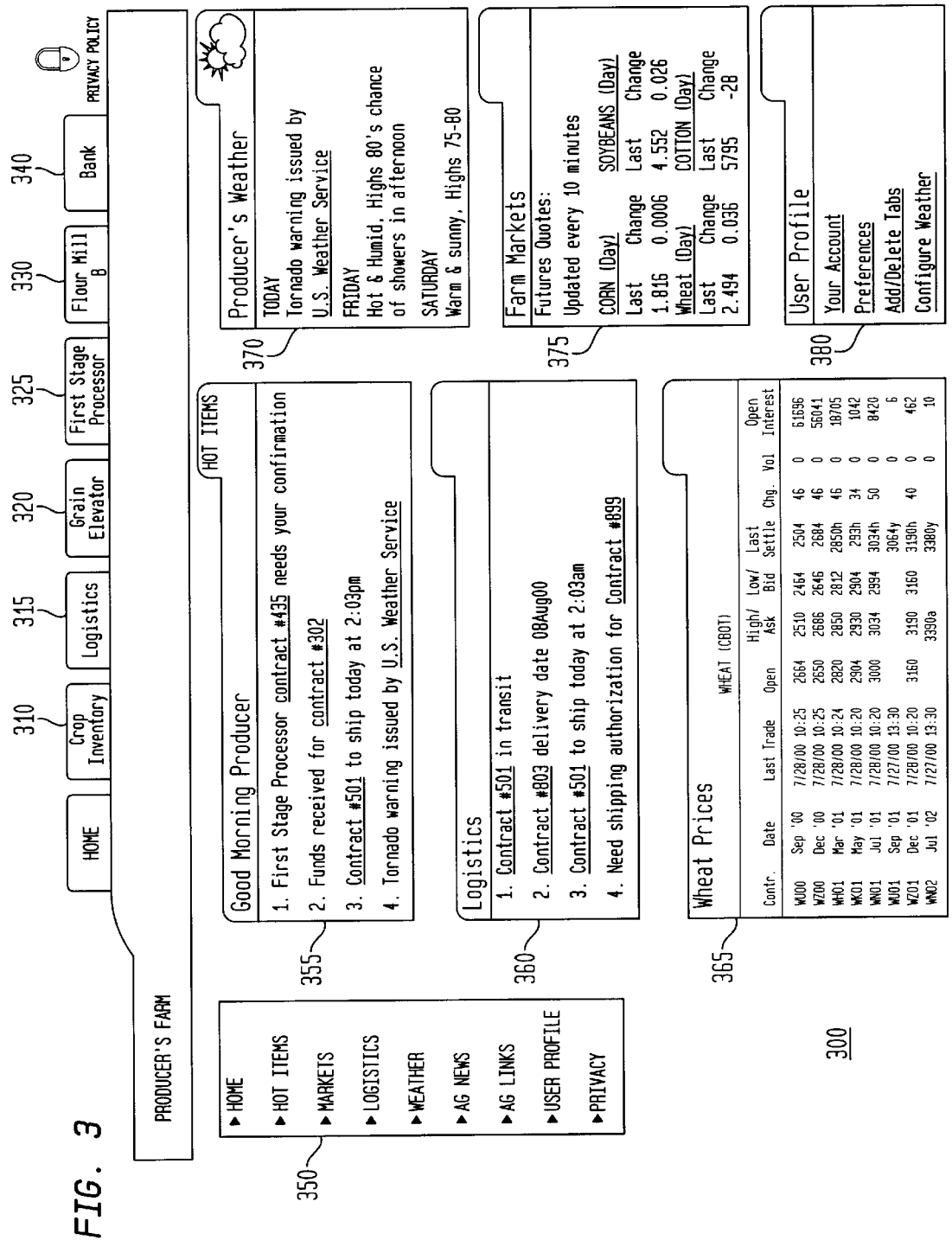
FIG. 3 shows an exemplary embodiment of a web page viewed by a producer within a supply chain.

FIG. 3 illustrates an exemplary embodiment of a home web page 300 viewable by a producer, such as a farmer, within supply chain 200. The layout and content of the home web page 300 and other web pages associated with the home web page 300 are merely exemplary. The web page 300 enables the farmer to transact and manage many aspects of its business, as well as monitor the needs of other individuals and businesses. Even though the exemplary embodiments are explained with reference to the crop wheat, the present invention can be applied to other varieties of crops, livestock, farm inputs, machinery products, and a host of other products or services used in the business of farming, processing, or distributing of agricultural products and food.

The home web page 300 provides the farmer with many transactional and managerial abilities. In an exemplary embodiment, by selecting crop inventory tab 310, the farmer can input information about its crops and inventory into, for example, database 135. The farmer has the ability to track the crop information from the time of planting through harvesting by field, by crop, by characteristic of the crop and/or by storage area on the farm, and know where all of this information resides real-time. As a result, the farmer can track by an inventory number the total crop, harvesting, and storage information which can then be passed on to those seeking to buy its crops.

Logistics tab 315 allows for the arrangement and management of any shipping of the farmer's crops to one or more of the farmer's customers or those who merchandise the farmer's crops, for example, to a processing mill, and to a grain elevator. A number of shipping services can be utilized including, but not limited to, truck and rail services. Further, the logistics web page accessed upon clicking the logistics tab 315 allows the farmer to track shipments going out and coming in, for example, by order lot number and customer. Logistics box 360 which is viewable on the farmer's home web page 300 lists some of the logistics items that are also viewable on the logistics web page. These logistics items include contracts in transit, upcoming contract delivery dates and requests for authorization of particular contracts or they could include estimates from logistics providers for the cost of handling any of the farmer's logistic needs or related services. In an exemplary embodiment, the logistics items viewable in logistics box 360 are the most timely or time sensitive items. For example, a particular contract may need shipping authorization that day or a notice may be posted that a contract is in transit or have a need to be priced that day to make it to market in time to catch the price being offered. All other logistics items are viewable at the logistics web page.

In a further exemplary embodiment, the farmer can input at the logistics web page that the farmer has a certain quantity, and quality, of a product to ship from a particular farm's storage, or from a grain elevator, that has rail or truck capacity to another location. The farmer could then send out the request for a bid or contract with a known shipping service or ship according to an existing contract the farmer has.

Grain elevator tab 320 provides the farmer access to an elevator web page for conducting and managing various aspects of business with one or more grain elevators. Aspects of business that can be conducted with a grain elevator through the elevator web page include ordering shipping to and from one or more grain elevators, monitoring what crop and how much of the farmer's crop is stored at each grain elevator and making payments for storage. Moreover, the farmer has access to information about how the crop is being stored, for example, if certain quality traits are being preserved. Such traits include ensuring that organic crops are stored in organic locations and GMO and nonGMO crops or other identity preserved items are stored into the appropriate respective storage locations. The elevator could also communicate all manner of market making information to the farmer enabling the farmer to instruct the elevator on how to sell or hedge the farmer's crops.

Figure 4:
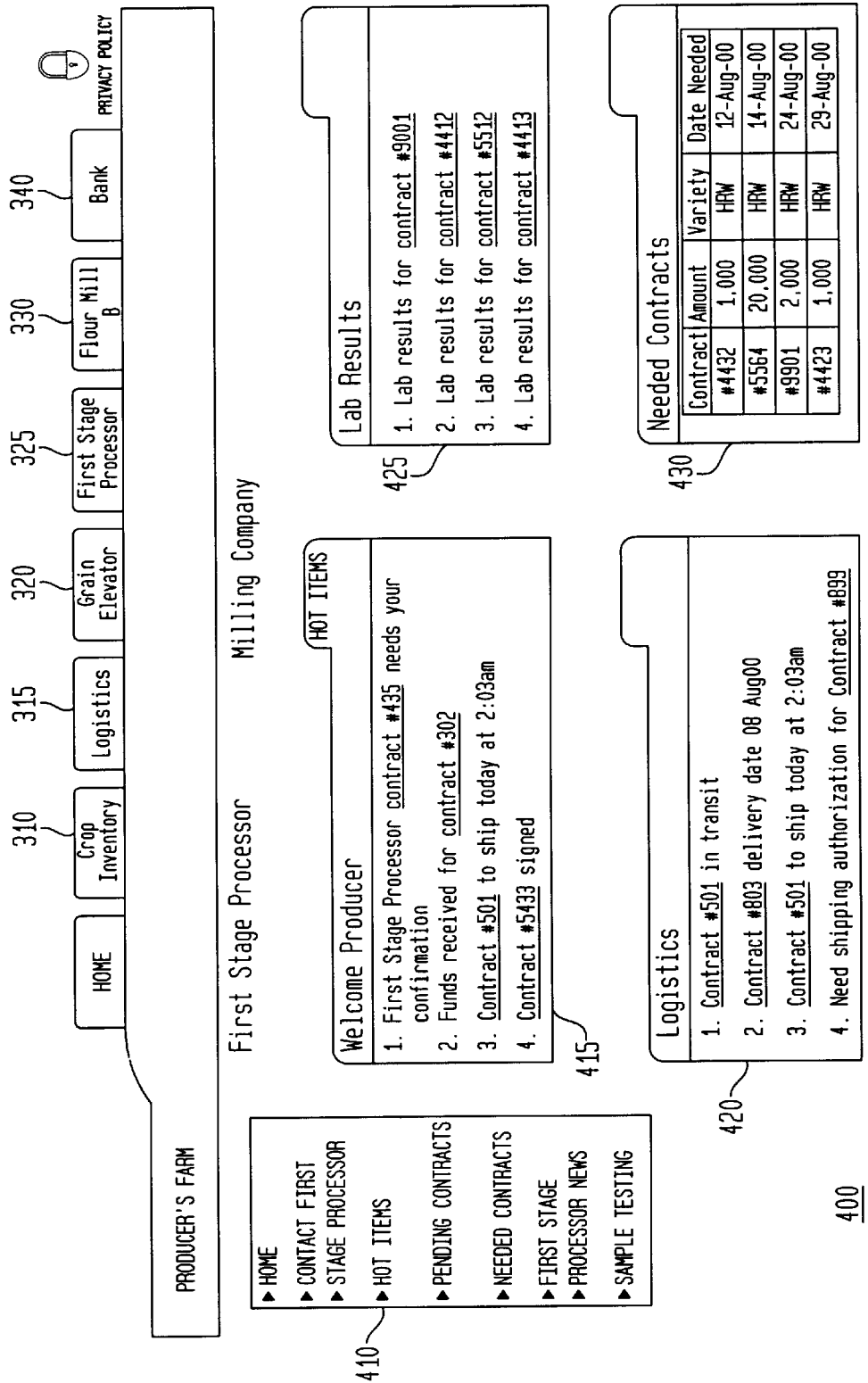
FIG. 4 shows an exemplary embodiment of a web page viewed by a producer within a supply chain.

First stage processor tab 325 provides the farmer access to a processor web page for conducting and managing various aspects of business with a first stage processor, such as a flour milling company, who the farmer sells wheat to. In an exemplary embodiment, agreement information is viewable via the first stage processor tab 325. For example, the first stage processor may have a need for five thousand bushels of a particular variety of wheat and that request is transmitted to one or more producers, the farmer being one. The producer can view that request via one of producer interfaces 105a . . . 105n and respond by entering into a contract, for example, for a thousand bushels of a particular wheat. Specifically, if the farmer can satisfy the first stage processor's needs, the farmer could enter into a contract with the first stage processor through a web site 400 accessed by the first stage processor tab 325. The first stage processor's needs will thereafter adjust to four thousand bushels. FIG. 4 discussed below is an exemplary embodiment of the web page 400 viewed by the farmer upon clicking the first stage processor tab 325.

Flour mill B tab 330 provides the farmer access to another processor web page, for example, another first stage processor or a processor at a subsequent stage. In an exemplary embodiment, the functioning of this processor web page is similar to the functioning of the previously discussed processor web page. In a further exemplary embodiment, there is a single processor tab that has a number of different locations or processors that the farmer can sell its product to.

Bank tab 340 gives the farmer access to a bank web page that allows the farmer to attend to its banking needs, for example, those needs arising out of transactions from elsewhere in the transaction supply chain system 100. For example, if the farmer stores its wheat at a grain elevator, it can view at the bank web page accessible through the bank tab 340 the funds used to pay for such storage. Further, if the farmer sells its wheat to the first stage processor, the farmer can view the funds received from the first stage processor. Also, if the farmer owes the first stage processor a payment, the farmer could through the bank web page accessible by clicking on the bank tab 340 put in a request to send the first stage processor the appropriate payment, as well as monitoring that the first stage processor has already received the payment. Similarly, the farmer can have access to other services as well via the home web page 300, such as logistics, purchase of inputs and machinery repairs. Thus, bank tab 340 is merely illustrative of one of the services that can be available to the farmer via, for example, the home web page 300.

Box 355 which is viewable by the farmer on the home web page 300 list hot items and/or action status. In an exemplary embodiment, hot items are business information that is at the top of a chronological hierarchy sorted by time date —the most time sensitive information. For example, if a certain contract is shipping that day, such information can be included in the appropriate place in the box 355. As a result, the farmer has a quick reference to items on which some action, for example, an acknowledgment, is useful to the farmer itself or others in transactional supply chain system 100. Note that item 3 in box 355 is the same as item 3 in logistics box 360 since it pertains to shipping information for that day which could be considered a hot item.

In an exemplary embodiment, the farmer can view each contract referred to on the home web page 300 or on any link from the home web page 300 by clicking on the hyperlink for that contract. In a further exemplary embodiment, the viewable contracts are images of the entire electronic signature contracts, as well as including summary information about, for example, the kind of crop, the amount of the crop, where the crop is stored and the monetary particulars. For example, the farmer can click on a particular contract # and there may be certain text highlighted for the farmer to confirm its approval or may ask the farmer to provide a missing piece of information if something is not filled out. Processor home web page 500 and manufacturer home web page 600 shown in FIGS. 5 and 6, respectively, also provide the capability to view each referred to contract. This allows the farmer to view the workings of each piece of its business without having to transverse several web sites of each supplier, buyer or provider of services.

In an exemplary embodiment, box 350 includes one or more links. These links include home, hot items, markets, logistics, weather, agricultural ("AG") news, AG links, user profile and privacy. The hot items link would connect the farmer to a hot items web page containing all the items of business that need prompt attention. Hot items are generated using a data sorting functionality that keeps the farmer's business sorted by date. However, any information can be pushed up to the top of the chronological list. In an exemplary embodiment, the farmer can make settings of how it wants its hot items to be arranged so that if the farmer clicks on the hot items link the farmer will see everything that is in box 355 and box 360 plus additional items that may not be as pressing. Hot items can also include a weather service warning, a crash in agricultural prices, a rise in agricultural prices and/or the sudden need of a customer to the farmer's specific crops.

The markets link in box 350 gives the farmer access to a markets web page having agricultural market information. In an exemplary embodiment, the home web page 300 includes a portion of the agricultural market information, for example, wheat prices box 365 and farm market box 375. In a further exemplary embodiment, the farmer can click on a portion of box 365 and box 375 to provide the farmer with more detailed market information. The agricultural prices are updated real-time or only after a certain predetermined amount of time.

The logistics tab in box 350 gives the farmer access to a logistics web page providing logistical, for example, shipping, information relevant to the farmer's business. The home web page 300 includes a portion of the logistical information in logistics box 360. The logistics information in logistics box 360 includes the most pressing shipping items such as notice that a certain contract is in transit, a contract delivery date, a contract will ship that date and/or a contract needs shipping authorization.

The weather link in box 350 gives the farmer access to a weather web page dedicated to weather information. In an exemplary embodiment, the weather information is restricted to weather conditions local to the farmer. In alternative embodiments, weather conditions and news for other regions can be accessed and displayed as well. Further, the farmer can request more specific weather information for a particular location through the weather web page. The home web page 300 includes a portion of the weather information available at the weather web page at weather box 370. In an exemplary embodiment, weather box 370 includes a listing of the current and short term weather forecast.

AG news link in box 350 gives the farmer access to an AG news web page dedicated to current and/or past agricultural news and to agricultural news at web sites managed/hosted by others. AG links in box 350 also provides the farmer access to other agricultural-related web sites managed/hosted by other systems. User profile link in box 350 gives the farmer access to a functional web page where the farmer can control the settings for all the various functions provided via home web page 300. User profile box 380 also allows the farmer to access the farmer's account, view and/or change preferences, add and delete tabs, and configure weather. Privacy link in box 350 gives the farmer access to a web page providing information about a privacy policy.

It should be noted that the farmer, the processor, the elevators and the manufacturer each can decide on the layout and informational content of the respective home web page through the use of a personalization engine whose purpose is to create a series of proprietary collaborative networks to enable the effective value enhanced supply chain to benefit each of the participants. There are a variety of personalization engines that are well known in the art which can be used, such as Vantage Point™ for agricultural services. For example, the farmer may decide that it does not want to view certain boxes or links on the home web page 300, but still have access to such information through other channels.

FIG. 4 depicts the processor web page 400 accessible through the first stage processor tab 325 of the home web page 300. Web page 400 provides information about business transacted between the farmer and the customer, the first stage processor. Tabs 310, 315, 320, 325, 330 and 340 are the same as those discussed with reference to FIG. 3 and therefore are not discussed again.

Box 415 includes hot items that pertain to the first stage processor's transaction information regarding past, future and ongoing contracts. Hot items can include an indication that a particular first stage processor contract needs a confirmation, funds have been received from the first stage processor for a particular contract, the first stage processor has sent funds for a particular contract, a contract is to ship that day and/or a particular contract has been signed. Logistics box 420 includes the most pressing logistical information that only pertains to the first stage processor. Note that item 3 in box 415 is the same as item 3 in logistics box 420 since it pertains to logistics information regarding a first stage processor contract that is time sensitive. Other features of the logistic tab 315 and the logistic box 420 were described above with reference to FIG. 3 and are not explained again.

Lab results box 425 includes a listing of the lab results for particular contracts. If the farmer clicked on a contract number in lab results box 425, the farmer could view the lab results for that particular contract. Lab result information can include a variety of things like protein, DNA, pesticide content, moisture, foreign matter, ash, vitamin and mineral make-up varying greatly depending on which crop or livestock item is tested. In an exemplary embodiment, a third party inputs the lab results that are thereafter transmitted and stored in a database of transactional supply chain system 100 and viewable via the lab results box 425. There can be a number of points in the process where quality checks can be added as a manufacturing process progresses. Such quality checks can be added, for example, at predetermined points along a supply chain and reported to one or more participants.

Needed contracts box 430 sets forth the contractual needs of the first stage processor. Specifically, the farmer views the amount, variety and date the crop is needed by. In an exemplary embodiment, such information is viewable by more than one farmer. For example, the first stage processor may put out a request to all of its producers that it needs 1,000 bushels of a certain wheat by a certain date. The farmer can click on a contract number hyperlink and notify the first stage processor that it has all or some of the desired wheat for sale. The first stage processor can thereafter accept the offer. Once an agreement is entered into, for example, a contract is executed by the respective parties, the needed contract box 430 is updated real time—the needed quantity is reduced accordingly or the contract entry is eliminated.

Box 410 includes a contact first stage processor link, a hot items link, a pending contracts link, needed contracts link, a first stage processor news link and a sample testing link. The contact first stage processor link allows the farmer to contact the first stage processor for example by providing a phone number and address information and/or having a link to an e-mail application. Hot items link functions as described above with reference to FIG. 3, however, with reference to FIG. 4 only hot items associated with the first stage processor are displayed. Pending contracts link and needed contracts link allow the farmer to view all pending contracts with and needed contracts for the first stage processor. Needed contracts box 430 displays only the portion of the needed contract information that is the most time sensitive. First stage processor news link provides the farmer with any news the first stage processor wishes to disseminate. Sample testing link provides information, such as protein, ash, moisture, foreign matter, GMO, non-GMO, and organic information.

Figure 5:
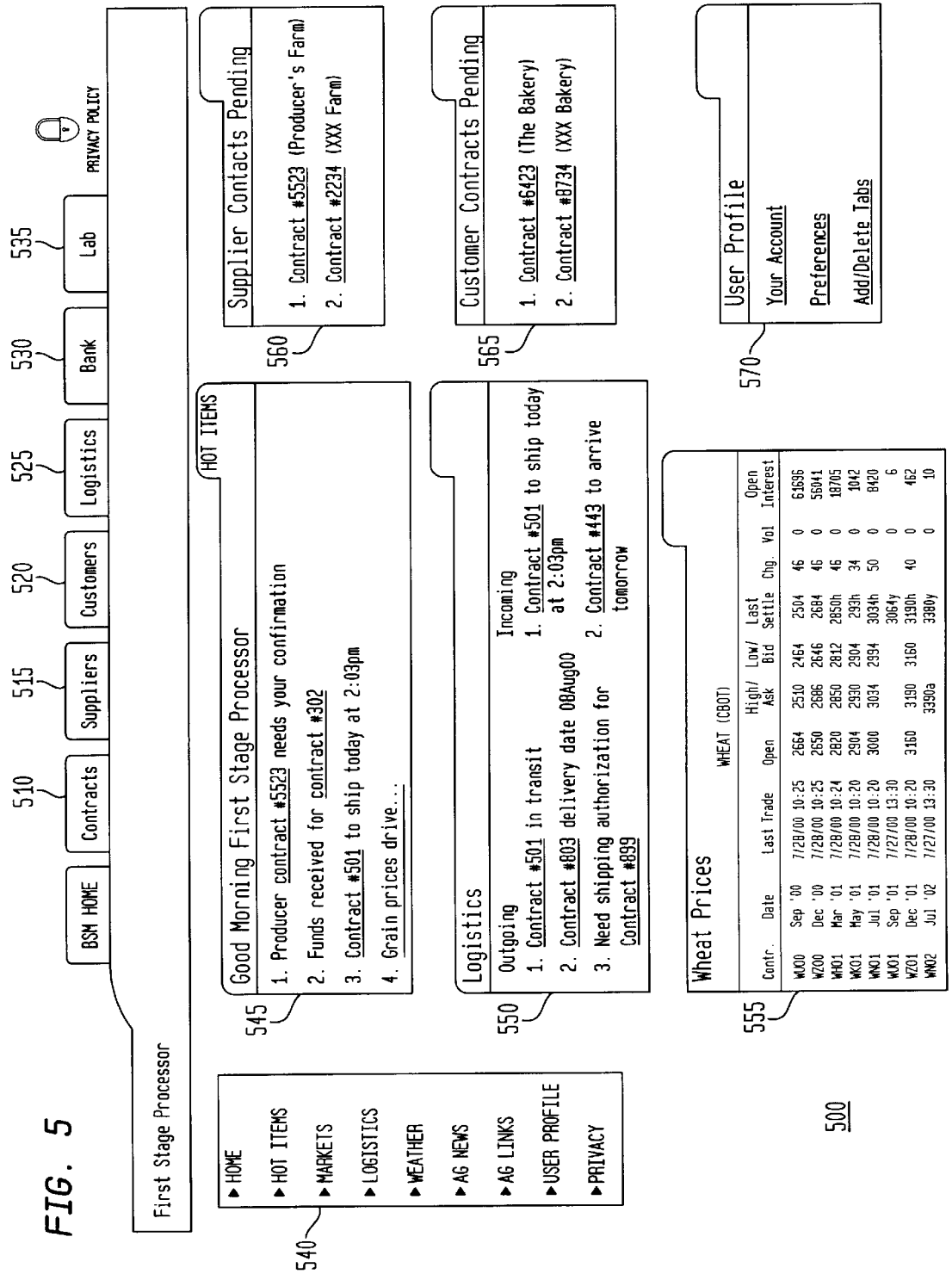
FIG. 5 shows an exemplary embodiment of a web page viewed by a first stage processor within a supply chain.

FIG. 5 illustrates the home web page 500 of a processor, for example, the first stage processor. The layout and content of the home web page 500 and the web pages associated with the home web page 500 are merely exemplary. The home web page 500 is the web page viewed by the first stage processor when it accesses transactional supply chain system 100 via one of processor interface 110a . . . 110n. Numerous tabs, boxes and links have similar functions as described with reference to FIG. 3 and therefore are not explained again. These tabs and boxes include logistics tab 525, bank tab 530, wheat prices box 555, user profile box 570 and each of the links in box 540. Note, however, that each of the tabs, boxes and links provide information pertaining to the first stage processor. For example, box 545 includes hot items pertaining to what the first stage processor needs to do on that given day and/or other time sensitive information.

Contracts tab 510 provides the first stage processor information pertaining to all contract information, including pending supplier contracts and all pending customer contracts. Supplier contracts pending box 560 and customer contracts pending box 565 illustrates a portion of the contract information that is the most time sensitive information. When the first stage processor confirms a new contract, the contracts web page accessible via the contract link 510 is updated to include another entry for supplier contracts pending. Further, if the contract is time sensitive it could also be listed in supplier contracts pending box 560.

Suppliers tab 515 provides the first stage processor information regarding all of its suppliers and information pertaining to all transactions from incoming items, such as raw material. Customers tab 520 provides the first stage processor information regarding all of its customers, for example, bakery customers, and information pertaining to all transactions from outgoing products, such as flour. The first stage processor can transact business with its suppliers and customers through the web pages accesses via the suppliers tab 515 and the customers tab 520, respectively. In an exemplary embodiment, the web pages accessible via the customers tab 520 and suppliers tab 515 have their own hot items box for each of the customers and suppliers.

Logistics tab 525 allows the first stage processor to track what is coming in and what is going out, as well as transact any needed business with shipping services. For example, all transactions regarding wheat that has been or will be received and all transactions regarding flour that has been or will be sent out can be tracked. Other information can be tracked as well. Logistics box 550 illustrates the logistics information that is the most time sensitive. In addition, lab tab 535 provides the first stage processor access to lab test results of items coming in and processed items going out.

Figure 6:
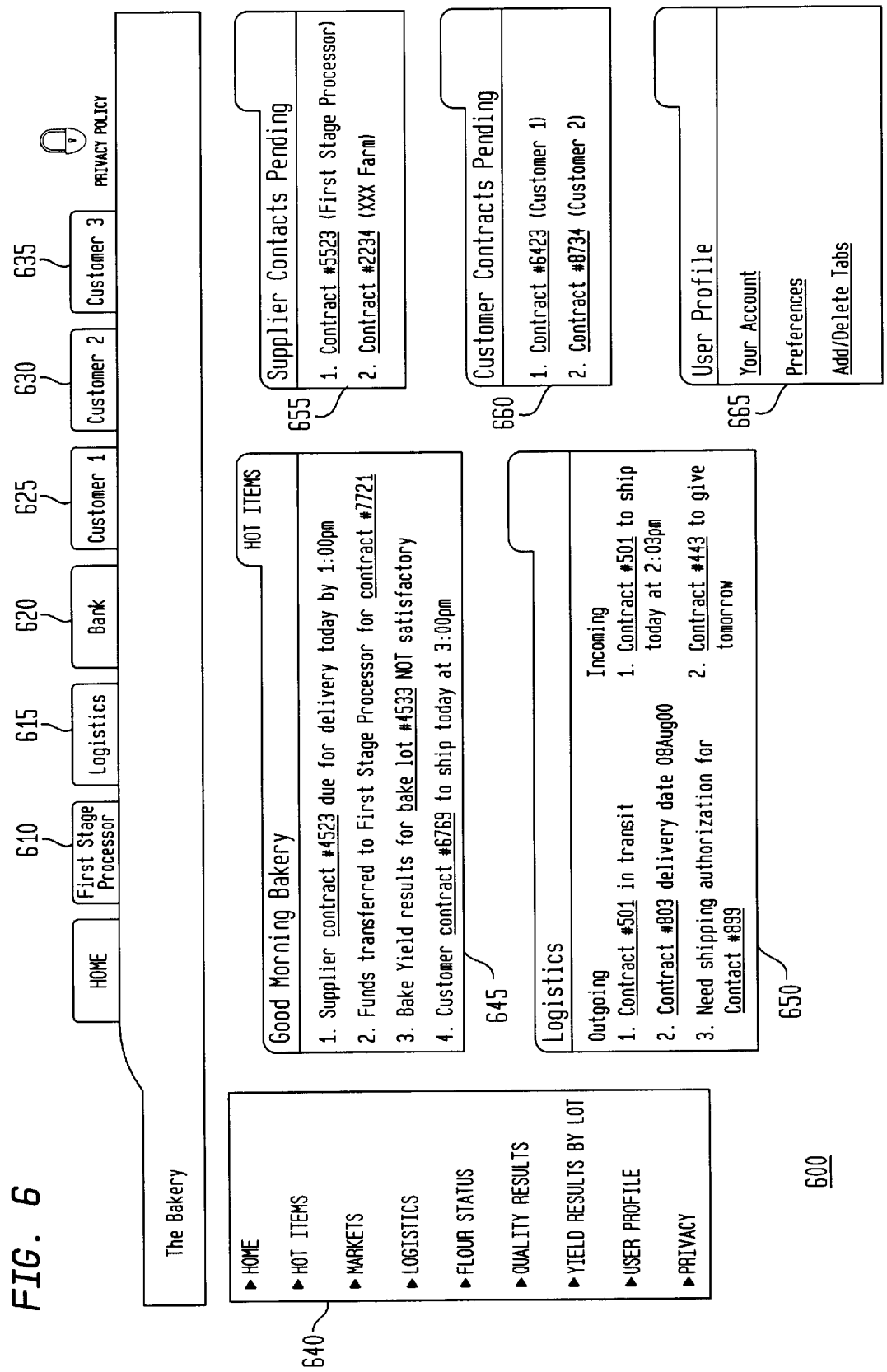
FIG. 6 shows an exemplary embodiment of a web page viewed by a manufacturer within a supply chain.

FIG. 6 illustrates the home web page 600 of a manufacturer, for example, a bakery. The layout and content of the home web page 600 and the web pages associated with the home web page 600 are merely exemplary. The home web page 600 is the web page viewed by the bakery when it accesses transactional supply chain system 100 via one of manufacturer interfaces 115a . . . 115n. Numerous tabs, boxes and links have similar functions as described with reference to FIGS. 3, 4 and 5 and therefore are not explained again. These tabs and boxes include logistics tab 615, bank tab 620, hot items box 645, logistics box 650, supplier contracts pending box 655, customer contracts pending 660, user profile box 665 and home, hot items, markets, logistics, user profile and privacy links in box 640. Note, however, that each of the tabs, boxes and links provide information pertaining to the bakery. For example, hot items box 645 includes hot items relating to the bakery's business that are time sensitive.

First stage processor tab 610 provides the manufacturer, the bakery, access to a web page including information about the first stage processor which is supplying flour to the bakery. Specifically, the first stage processor web page includes all business information regarding the first stage processor, such as all the pending and executed transactions that are involved in buying flour from the first stage processor. For example, information stating that the bakery expects to receive a certain quantity of a certain type of flour on a particular date. Further, the bakery can request that it needs, for example, five thousand pounds of rye flour by a certain date and the first stage processor could thereafter enter into an electronic contract with the bakery to supply the flour.

Customer links 625, 630, 635 provide the bakery access to respective web pages for individual customers. The bakery provides to its customers, for example, bread products such as rolls and frozen dough.

Flour status link in box 640 provides the bakery with access to a web page having test results and quality reports for incoming flour that was sent to the bakery by its various suppliers. In other words, the web page could provide a quality snap shot of all the flour the bakery has in its inventory. Quality results link in box 640 provides the bakery with access to a web page having quality and test results of outgoing baked products. Yield results by lot shows relative performance for traceable flour and provides the bakery access to a web page for inputting information concerning how much product the manufacturer got from a given shipment of flour. For example, the bakery made x number of rolls out of x pounds of flour. The bakery can also design specific products with specific label claims knowing the information set forth above through information acquired by the farmer and the first stage processor. Such web pages allow the bakery or any other participant to track a lot of wheat completely from a retailer to the field of a farmer in the event of a food safety question, thereby enhancing the ability of the bakery to service its customers with more product offerings and to step up the ability to comply with growing food safety regulations based on traceability on the federal and state level.

In an exemplary embodiment, an ingredient history of a product is stored in one or more databases of transactional supply chain system 100 which allows tracing and verification of at least all product ingredients all the way back to one or more seed companies, or further if applicable. The database can be either database 135, database 140 or database 145, or a combination thereof. Other databases not shown in the drawings can be utilized as well. In a further exemplary embodiment, information is transmitted back to an originator of an ingredient, for example, a company providing seeds, informing the seeding company of the performance of its seeds at one or more points along a supply chain.

FIGS. 7 through 15 illustrate an exemplary embodiment for tracing an item as the item develops into another item and progresses along a supply chain. Like reference numerals designate like data in the figures. In the exemplary embodiment, a supply chain including a farm, a mill and a bakery and a product such as bread is described. The components of this supply chain and the item, however, are merely illustrative.

Figure 7:
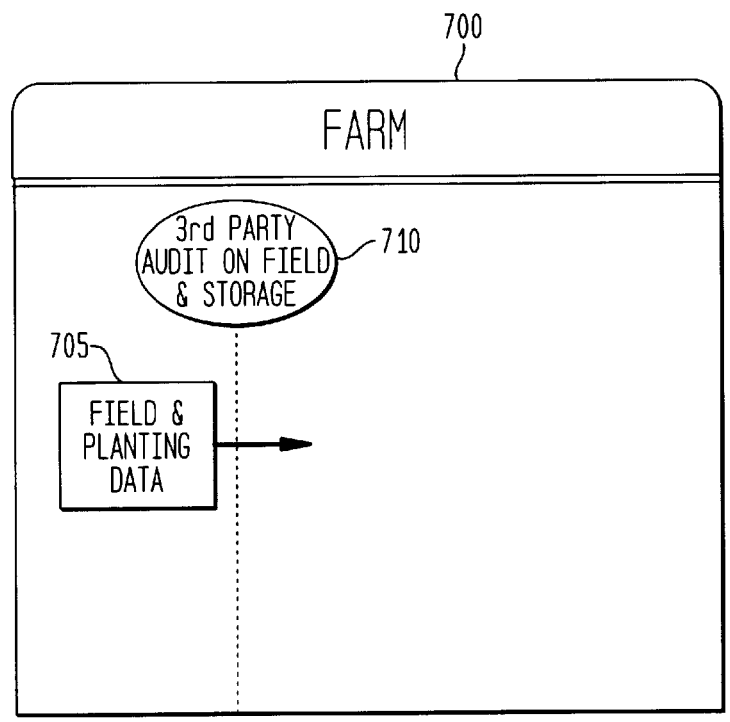
FIG. 7 shows an exemplary embodiment for tracing the history of a product.
Figure 8:
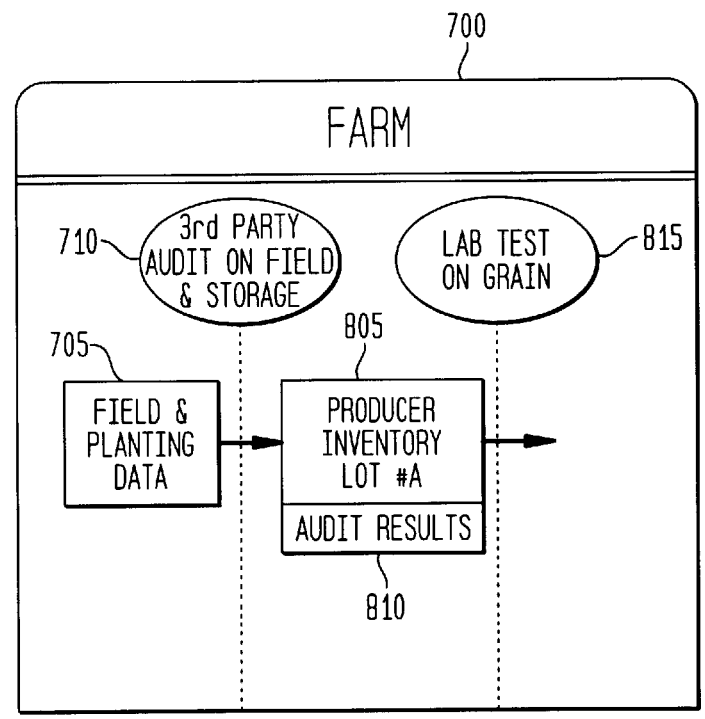
FIG. 8 shows an exemplary embodiment for tracing the history of a product.
Figure 9:
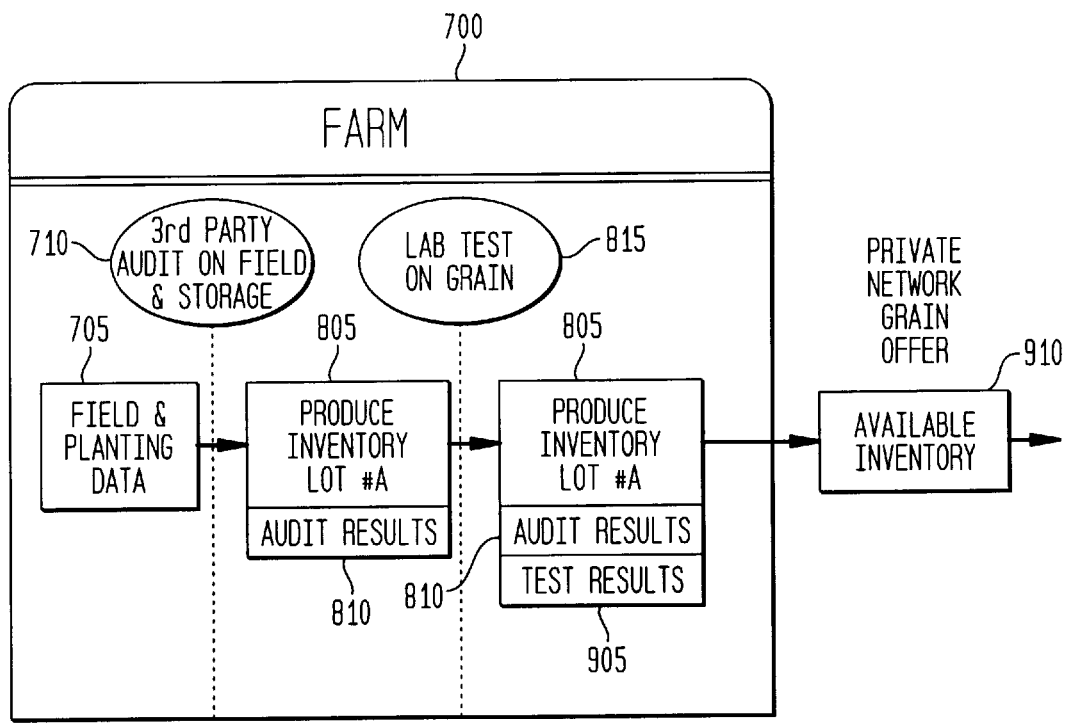
FIG. 9 shows an exemplary embodiment for tracing the history of a product.

FIGS. 7 through 9 illustrate the tracing of the ingredients used in a particular bread product starting at the farm stage 700 of a supply chain. As previously noted, the tracing of ingredients of products can begin before a producer, such as from a seeding stage. The tracing of the bread product ingredients begins when a farmer inputs information about the wheat used in the bread product, for example, field and planting data 705, into database 135 via the respective producer interface 105a . . . 105n, as shown in FIG. 7. Field and planting data 705, as well as storage information if applicable, is then audited, for example, by a third party 710 and audit results data 810, shown in FIG. 8, is generated and stored in database 135. The grain is thereafter harvested and marked as a specific inventory lot. Information about the harvested grain, for example, quantity and quality information, is input by the farmer into database 135 and stored as producer inventory lot #A data 805 shown in FIG. 8. Audit results data 810 and producer inventory lot #A data 805 are stored in database 135 either together as a single record or as multiple records in association with each other. A lab test on the grain 815 is performed and test results data 905, shown in FIG. 9, is generated and stored in database 135. As can be seen in FIG. 9, producer inventory lot #A data 805, audit results data 810 and test results data 905 are stored in database 135 either together as a single record or as multiple records in association with each other. The grain, referred to in FIG. 9 as available inventory 910, is then offered for sale in transactional supply chain system 100.

Figure 10:
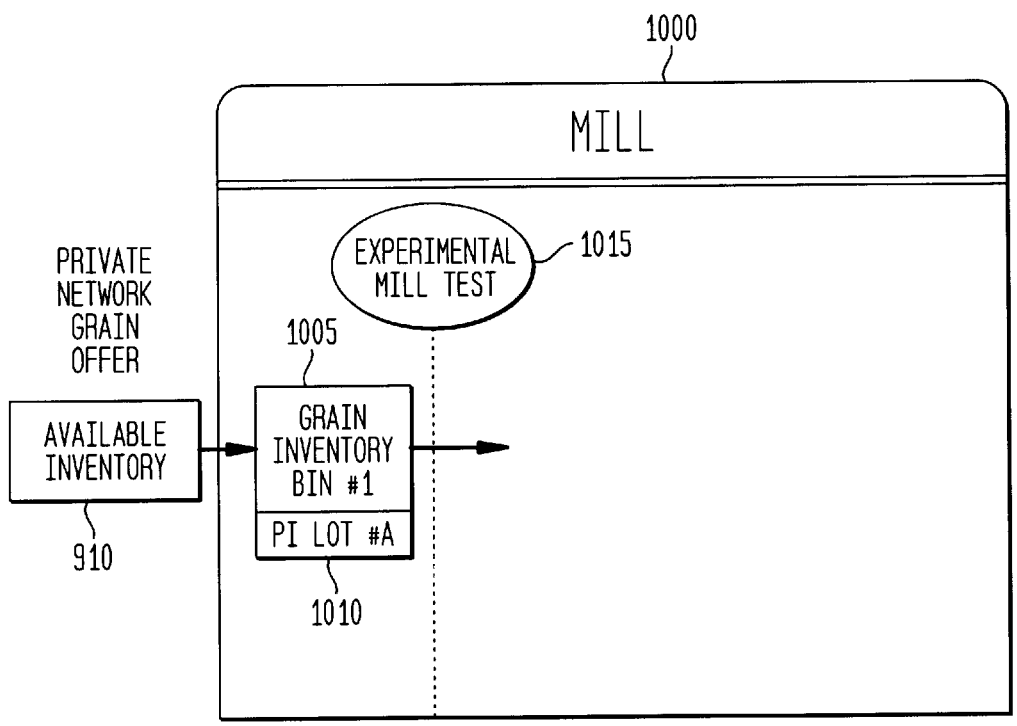
FIG. 10 shows an exemplary embodiment for tracing the history of a product.
Figure 11:
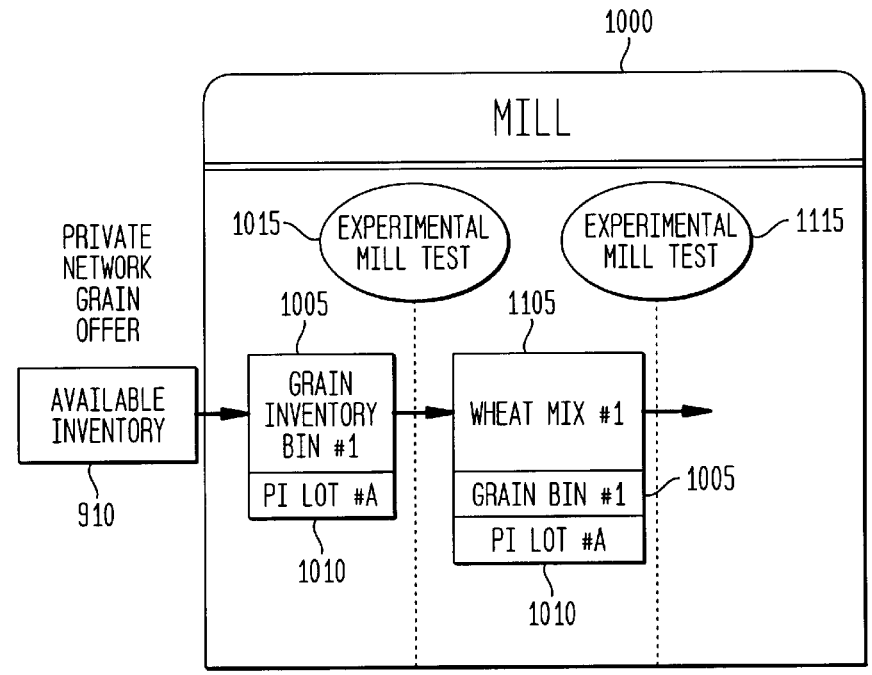
FIG. 11 shows an exemplary embodiment for tracing the history of a product.
Figure 12:
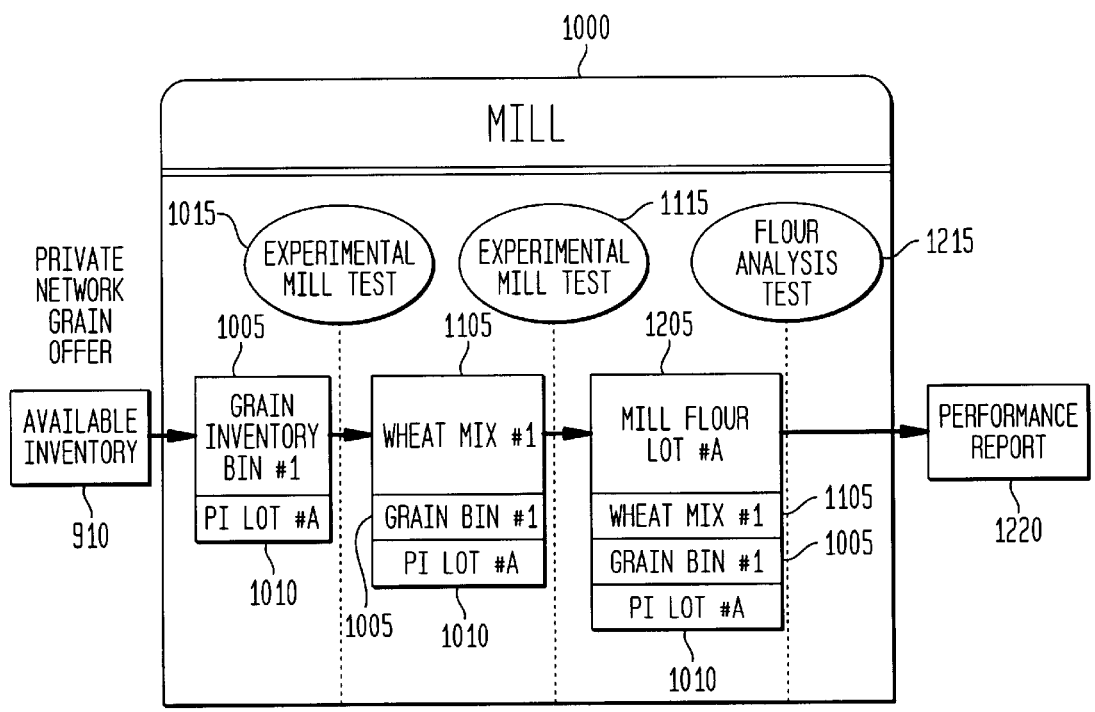
FIG. 12 shows an exemplary embodiment for tracing the history of a product.

FIGS. 10 through 12 illustrate the tracing of the wheat and flour used in the particular bread product at the mill stage 1000 of the supply chain. Available inventory 910 or a portion thereof is purchased by a mill, as shown in FIG. 10, for example, via one of processor interfaces 110a . . . 110n. Information about the purchased grain, for example, the location of the stored grain, the quantity of the grain and the quality of the grain, is generated and stored in database 140 as grain inventory bin #1 data 1005. Further, PI lot #A data 1010 is generated which includes all known information about the available inventory 910 purchased from the farmer. In an exemplary embodiment, this information includes producer inventory lot #A data 805, audit results data 810 and test results data 905. PI lot #A data 1010 and grain inventory bin #1 data 1005 are stored in database 140 either together as a single record or as multiple records in association with each other. An experimental mill test 1015 is then performed and mill test results data is generated and stored in database 140.

Next, the mill creates a wheat mix in part from the grain of available inventory 910 and generates and stores wheat mix #1 data 1105 in database 140, as shown in FIG. 11. Wheat mix #1 data 1105 includes, for example, quantity information and quality information. Further, grain bin #1 data 1005, shown in FIG. 11 under wheat mix #1 data 1105, also includes mill tests results data from experimental mill test 1015. Wheat mix #1 data 1105, grain bin #1 data 1005 and PI lot #A data 1010 are stored in database 140 either as a single record or as multiple records in association with each other. An additional experimental mill test 1115 is thereafter performed on the wheat mix and mill test results data is generated and stored in database 140. Specifically, wheat mix #1 data 1105, shown in FIG. 12 under mill flour lot A data 1205, also includes the mill test results data. The mill next processes the wheat mix into flour and generates information about the flour as mill flour lot A data 1205, as shown in FIG. 12. Mill flour lot A data 1205 includes, for example, quantity information and quality information. Mill flour lot A data 1205, wheat mix #1 data 1105, grain inventory bin #1 data 1005 and PI lot #A data 1010 are stored in database 140 either as a single record or as multiple records in association with each other. A flour analysis 1215 is then performed on the flour processed from the specific wheat mix and flour analysis data is generated and stored in database 140. Thereafter, a performance report 1220 is generated, for example, by the mill which can include an ability to compare all flour lots created at the mill. In an exemplary embodiment, the performance report 1220 includes the flour analysis data.

Figure 13:
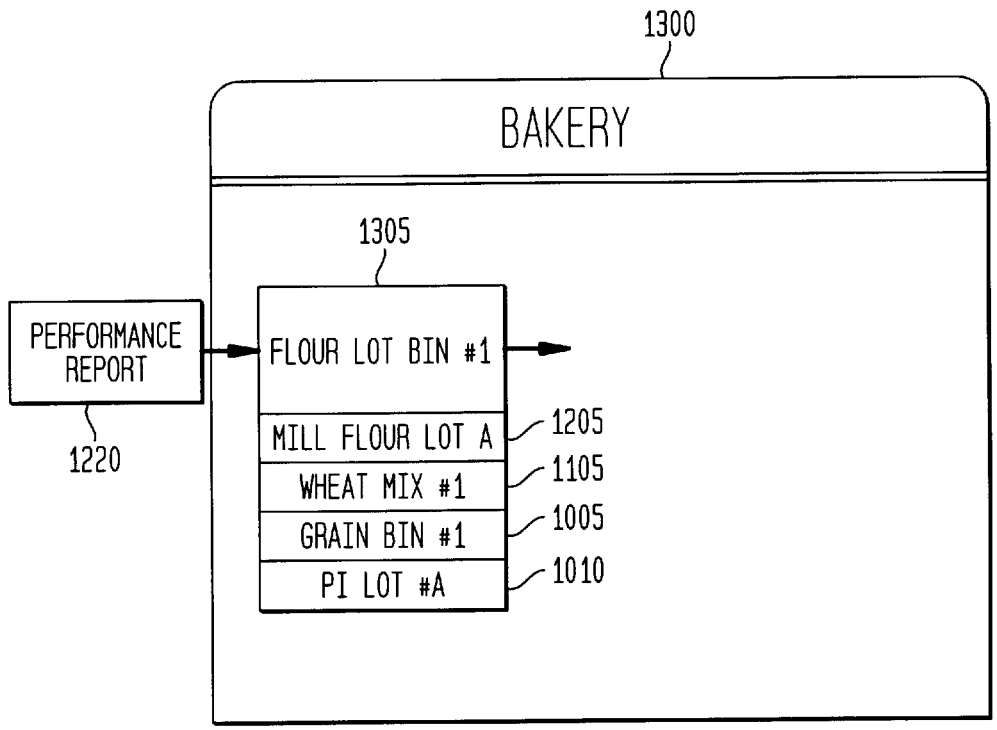
FIG. 13 shows an exemplary embodiment for tracing the history of a product.
Figure 14:
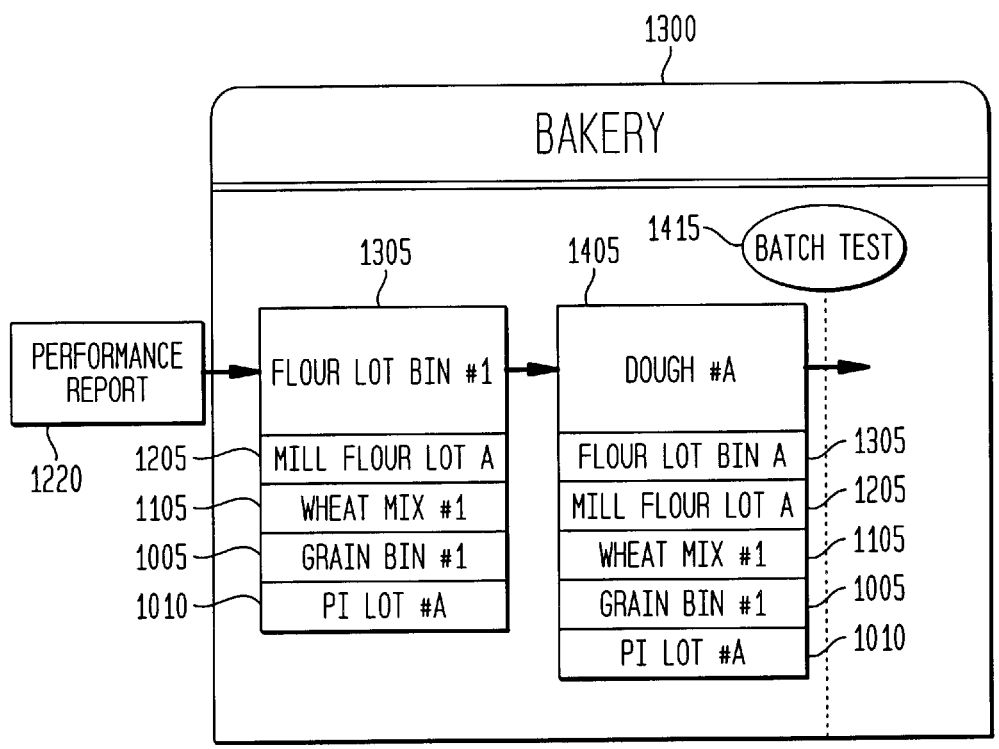
FIG. 14 shows an exemplary embodiment for tracing the history of a product.
Figure 15:
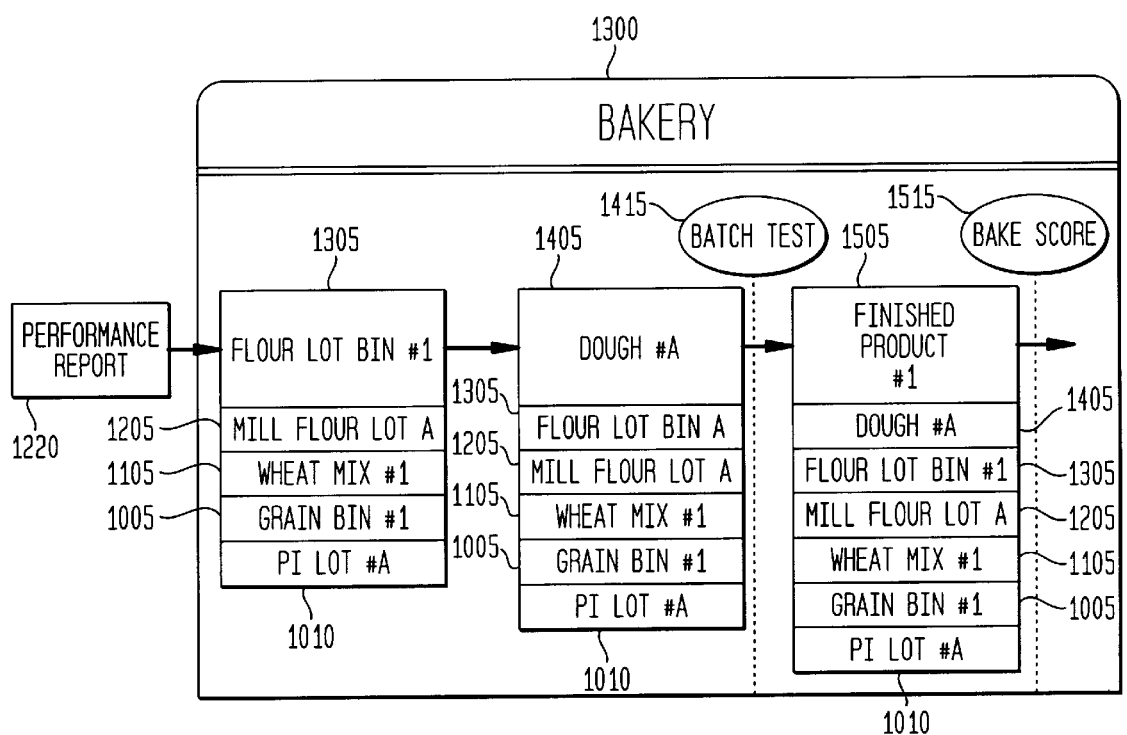
FIG. 15 shows an exemplary embodiment for tracing the history of a product.

FIGS. 13 through 15 illustrate the tracing of the flour, dough and finished bread product at a bakery stage 1300 of the supply chain. A bakery purchases the flour from the mill, receives performance report 1220 and stores the flour in a flour lot bin. Flour lot bin #1 data 1305 is generated which includes, for example, information about the location and conditions of the bin the flour is stored in, the quantity of the flour and the quality of the flour, as shown in FIG. 13. Flour lot bin #1 data 1305 is stored in database 145 along with data about the history of the flour. Specifically, flour lot bin #1 data 1305, mill flour lot A data 1205, wheat mix #1 data 1105, grain bin #1 data 1005 and PI lot #A data 1010 are stored in database 145 either as a single record or as multiple records in association with each other.

Using flour from the flour lot bin associated with flour lot bin #1 data 1305, the bakery creates dough and generates dough #A data 1405, as shown in FIG. 14. Dough #A data 1405 includes, for example, quantity information and quality information. Dough #A data 1405, flour lot bin #1 data 1305, mill flour lot A data 1205, wheat mix #1 data 1105, grain bin #1 data 1005 and PI lot #A data 1010 are stored in database 145 either as a single record or as multiple records in association with each other. Batch test 1415 is thereafter conducted on the dough corresponding with dough #A 1405 and batch test data is generated and stored in database 140. Specifically, dough #A data 1405, shown in FIG. 15 under finish product #1 data 1505, also includes the batch test data.

The dough is used by the bakery to create bread and the bakery generates finish product #1 data 1505 corresponding to the produced bread, as shown in FIG. 15. Finish product #1 data 1505 includes, for example, quantity information and quality information. Finish product #1 data 1505, dough #A data 1405, flour lot bin #1 data 1305 mill flour lot A data 1205, wheat mix #1 data 1105, grain bin #1 data 1005 and PI lot #A data 1010 are stored in database 145 either as a single record or as multiple records in association with each other. Performance, for example, quantity of loaves, texture and taste, are then scored and data indicative of the performance is stored in database 145 as bake score data 1515 and can be compared with other units of production.

Even though FIGS. 7 through 15 were described with reference to storing information in database 135, database 140 and database 145, other databases or memory storage devices can used as well. Further, the present application is not limited to the database architecture shown in FIG. 1. For example, a single database or cluster of databases networked together can be accesses by each of the interfaces shown in FIG. 1.

As a result of tracing the development of an item, such as a bread product, as described above with reference to FIGS. 7 through 15, information about every item, such as ingredients, included within the item can be verified. Information is continuously and progressively stored in one or more databases along an entire supply chain that allows one to verify a brand claim of a particular finished product or lot of finished products, such as XYZ product is 100 percent organic.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

We claim:

1. A supply chain system, comprising:
   a producer interface operable to allow a producer to input first information associated with producing an item, the first information including available inventory;
   a processor interface operable to allow a processor to input second information associated with processing of the item, the second information including available inventory; and
   a manufacturer interface operable to allow a manufacturer to input third information associated with manufacturing of the item, wherein
      any one or more of the producer, the processor, and the manufacturer can access any one of the inputted first information, the inputted second information, and the inputted third information via a network connection, and
      the processor controls inventory at least based on the available inventory input by the producer and the manufacturer controls inventory at least based on the available inventory input by the processor.

2. The supply chain system as set forth in claim 1, wherein the network connection is an Internet connection.

3. The supply chain system as set forth in claim 1, wherein the item is a crop.

4. The supply chain system as set forth in claim 3, wherein the first information includes at least one of planning data, pre-planting soil preparation data, crop variety data, crop quantity data, crop location data, inputs data, planting data, crop growth and monitoring data, storage data and quality data.

5. The supply chain system as set forth in claim 3, wherein the second information includes at least one of planning data, storage data, milling data, packaging data, finished product storage data, shipping data and quality data.

6. The supply chain system as set forth in claim 3, wherein the third information includes at least one of storage data, quality data and performance data.

7. A supply chain system, comprising:
   at least one producer interface operable to allow at least one producer to input first information, the first information including available inventory;
   a producer server coupled to the at least one producer interface for processing the first information associated with an item;
   a producer database coupled to the producer server for storing the first information;
   at least one processor interface operable to allow at least one processor to input second information, the second information including available inventory;
   a processor server coupled to the at least one processor interface for processing the second information associated with the item;
   a processor database coupled to the processor server for storing the processed second information;
   at least one manufacturer interface operable to allow at least one manufacturer to input third information associated with the item;
   a manufacturer server coupled to the at least one manufacturer sewer for processing the third information; and
   a manufacturer database coupled to the manufacturer server for storing the processed third information, wherein
      the producer server, the processor server and the manufacturer server are coupled to each other via an Internet connection, and
      the at least one processor controls inventory at least based on the available inventory input by the at least one producer and the at least one manufacturer controls inventory at least based on the available inventory input by the at least one processor.

8. The supply chain system as set forth in claim 7, wherein the item is a crop.

9. The supply chain system as set forth in claim 8, wherein to first information includes at least one of planning data, pre-planting soil preparation data, crop variety data, crop quantity data, crop location data, inputs data, planting data, crop growth and monitoring data, storage data and quality data.

10. The supply chain system as set forth in claim 8, wherein the second information includes at least one of planning data, storage data, milling data, packaging data, finished product storage data, shipping data and quality data.

11. The supply chain system as set forth in claim 8, wherein the third information includes at least one of storage data, quality data and performance data.

12. A method for tracing a first item and a second item that includes the first item, as the first item and the second item progress along a supply chain, comprising:
   associating first information with a first item at a stage of the supply chain, the first information including at least one of performance information and quality information;
   associating second information and the first information with a second item that includes the first item, at another stage of the supply chain, the second information including at least one of performance information and quality information, wherein at least one of the first information and the second information also includes available inventory; and
   transmitting the first information and the second information to at least one individual of a plurality of individuals within or outside the supply chain, wherein
      the at least one individual controls their individual inventory at least based on the available inventory.

13. The method for tracing a first item and a second item along a supply chain as set forth in claim 12, wherein the plurality of individuals includes at least one producer, at least one processor and at least one manufacturer.

14. The method for tracing a first item and a second item along a supply chain as set forth in claim 12, wherein the first item is a crop and the second item is a product that is processed from the crop.

15. The method for tracing a first item and a second item along a supply chain as set forth in claim 14, wherein the second information includes data corresponding to a processing of the crop.

16. The method for tracing a first item and a second item along a supply chain as set forth in claim 12, wherein the first information is stored in a first database, and the second information and the first information is stored in a second database.

17. The method for tracing a first item and a second item along a supply chain as set forth in claim 12, wherein associating the first information with the first item at the stage of the supply chain includes
   receiving the first information from an interface via a network connection; and
   storing the first information in a memory unit coupled to the interface, the memory unit accessible by a server.

18. The method for tracing a first item and a second item along a supply chain as set forth in claim 12, wherein associating the second information with the second item at the stage of the supply chain includes
   receiving the second information from an interface via a network connection; and
   storing the second information in a memory unit coupled to the interface, the memory unit accessible by a server.

19. A supply chain system, comprising:
   a processor interface operable to allow a processor to input information associated with processing an item, the information including available inventory; and
   a manufacturer interface operable to allow a manufacturer to input additional information associated with manufacturing of the item, wherein
      the processor and the manufacturer can access the inputted information and the inputted additional information via a network connection, and
      the manufacturer controls inventory at least based on the available inventory input by the processor.

20. The supply chain system as set forth in claim 19, wherein the network connection is an Internet connection.

21. The supply chain system as set forth in claim 19, wherein the item is a crop.

22. The supply chain system as set forth in claim 21, wherein the inputted information includes at least one of planning data, storage data, milling data, packaging data, finished product storage data, shipping data and quality data.

23. The supply chain system as set forth in claim 21, wherein the inputted additional information includes at least one of storage data, quality data and performance data.

24. A supply chain system, comprising:
a producer interface operable to allow a producer to input information associated with producing an item, the information including available inventory; and
a processor interface operable to allow a processor to input additional information associated with processing the item, wherein
the producer and the processor can access the inputted information and the inputted additional information via a network connection, and
the processor controls inventory at least based on the available inventory input by the producer.

25. The supply chain system as set forth in claim 24, wherein the network connection is an Internet connection.

26. The supply chain system as set forth in claim 24, wherein the item is a crop.

27. The supply chain system as set forth in claim 26, wherein the inputted information includes at least one of planning data, pre-planting soil preparation data, crop variety data, crop quantity data, crop location data, inputs data, planting data, crop growth and monitoring data, storage data and quality data.

28. The supply chain system as set forth in claim 26, wherein the inputted additional information includes at least one of planning data, storage data, milling data, packaging data, finished product storage data, shipping data and quality data.

29. A supply chain system, comprising:
at least one producer interface operable to allow at least one producer to input first information, the first information including available inventory;
at least one processor interface operable to allow at least one processor to input second information, the second information including available inventory;
at least one manufacturer interface operable to allow at least one manufacturer to input third information associated with the item;
a server coupled to the at least one producer interface, the at least one processor interface and the at least one manufacturer interface for processing the first information, the second information and the third information associated with an item; and
a database coupled to the server for storing the first information, the second information and the third information, wherein
the at least one producer interface, the at least one processor interface and the at least one manufacturer interface are coupled to each other via an Internet connection, and
the at least one processor controls inventory at least based on the available inventory input by the at least one producer and the at least one manufacturer controls inventory at least based on the available inventory input by the at least one processor.

* * * * *